United States Patent
Gruber

(10) Patent No.: US 7,875,224 B2
(45) Date of Patent: Jan. 25, 2011

(54) METHOD FOR PRODUCING A COATED COMPOSITE COMPONENT

(75) Inventor: Marco Gruber, München (DE)

(73) Assignee: Kraussmaffei Technologies GmbH, München (DE)

( * ) Notice: Subject to any disclaimer, the term of this patent is extended or adjusted under 35 U.S.C. 154(b) by 206 days.

(21) Appl. No.: 12/243,654

(22) Filed: Oct. 1, 2008

(65) Prior Publication Data

US 2009/0243148 A1 Oct. 1, 2009

Related U.S. Application Data

(63) Continuation of application No. PCT/EP2007/053532, filed on Apr. 11, 2007.

(30) Foreign Application Priority Data

Apr. 25, 2006 (DE) ............... 10 2006 019 007

(51) Int. Cl.
*B29C 45/04* (2006.01)
*B29C 45/06* (2006.01)
*B29C 45/16* (2006.01)

(52) U.S. Cl. ............ 264/250; 264/255; 264/328.1; 264/328.8; 264/248

(58) Field of Classification Search ............... None
See application file for complete search history.

(56) References Cited

U.S. PATENT DOCUMENTS

| | | | | |
|---|---|---|---|---|
| 3,184,527 A | * | 5/1965 | Fischer | 264/255 |
| 4,345,965 A | * | 8/1982 | Lindenmayer et al. | 156/500 |
| 4,410,478 A | * | 10/1983 | Lindenmayer et al. | 264/248 |
| 5,662,996 A | * | 9/1997 | Jourquin et al. | 428/318.8 |
| 6,544,449 B1 | * | 4/2003 | Gardner | 264/46.5 |
| 2010/0166998 A1 | * | 7/2010 | Bannister et al. | 428/61 |

FOREIGN PATENT DOCUMENTS

| | | |
|---|---|---|
| DE | 41 39 035 A1 | 6/1993 |
| DE | 43 18 574 A1 | 12/1994 |
| DE | 69905745 T2 | 2/2004 |
| EP | 0 495 219 A | 7/1992 |
| EP | 0 543 085 A1 | 5/1993 |
| EP | 0 894 604 A1 | 2/1999 |
| EP | 0 995 568 A | 4/2000 |

* cited by examiner

*Primary Examiner*—Edmund H. Lee
(74) *Attorney, Agent, or Firm*—Henry M. Feiereisen; Ursula B. Day

(57) ABSTRACT

In a method for producing a coated composite component, an injection-molded part is produced in a first cycle by introducing a melt into the cavity of a first mold. A polyurethane layer is then applied to the cavity surface of an open polyurethane mold half. The mold half with the injection molded part produced in the first cycle is associated with the polyurethane mold half, and the so formed second mold is closed. The polyurethane layer is pressed or embossed onto the injection-molded part in the second mold, and the coated injection-molded part is removed once the second mold has been opened.

27 Claims, 10 Drawing Sheets

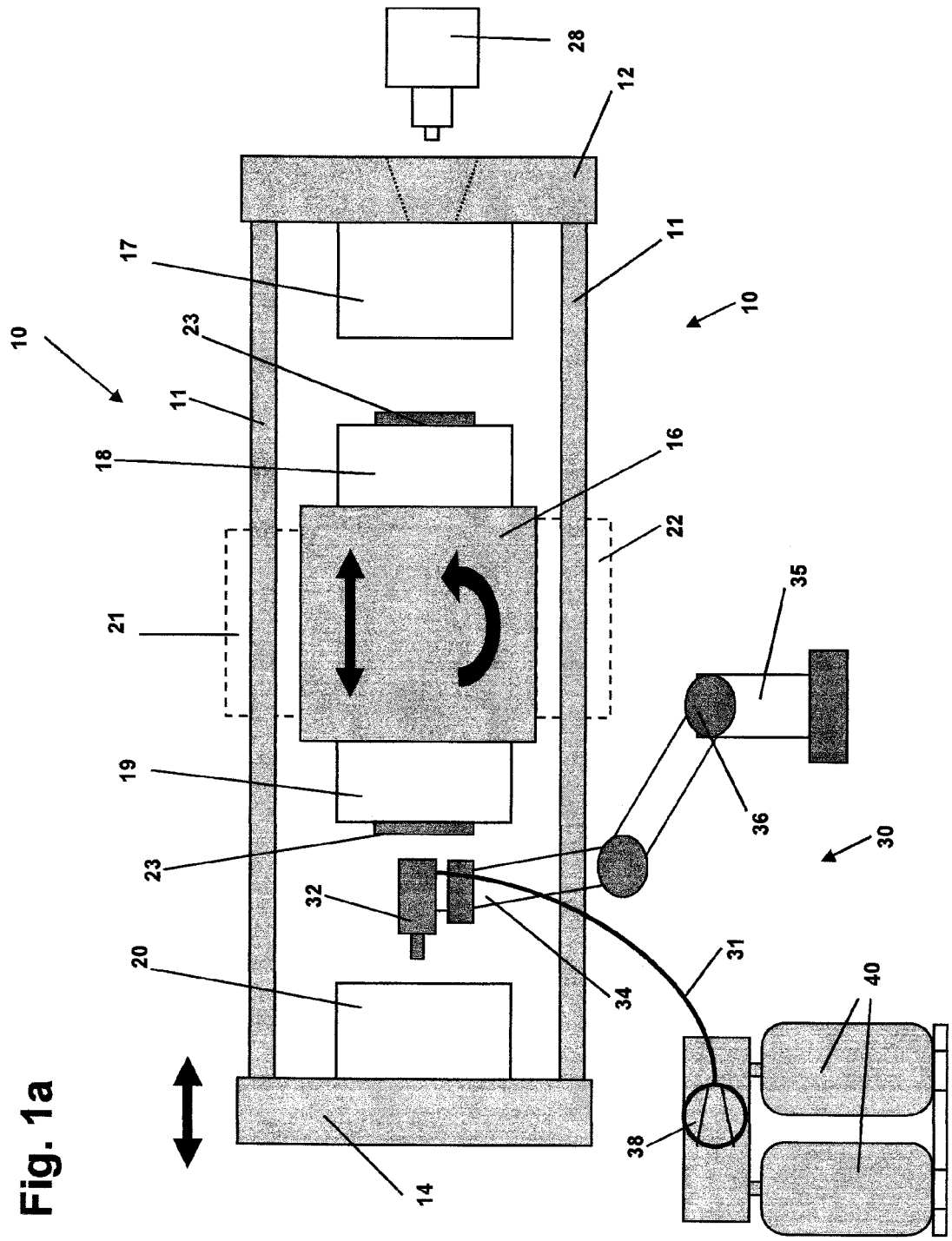

METHOD FOR PRODUCING A COATED COMPOSITE COMPONENT

CROSS-REFERENCES TO RELATED APPLICATIONS

This application is a continuation of prior filed copending PCT International application no. PCT/EP2007/053532, filed Apr. 11, 2007, which designated the United States and has been published but not in English as International Publication No. WO 2007/122107 and on which priority is claimed under 35 U.S.C. §120, and which claims the priority of German Patent Application, Serial No. 10 2006 019 007.6, filed Apr. 25, 2006, pursuant to 35 U.S.C. 119(a)-(d), the contents of which are incorporated herein by reference in its entirety as if fully set forth herein.

BACKGROUND OF THE INVENTION

The present invention relates to a method for producing a coated composite component. More particularly, the present invention relates to a method to fabricate composite components from a thermoplastic plastic support by coating, for example, with polyurethane, to produce various desired surface structures or haptics.

It is known to form a polyurethane skin in a first method step. A skin of this type can be produced, for example, using a so-called slush process or a spray process. In a slush process, a plastic powder or a plastic granulate is melted in an electroform whereby the material is deposited by forming a corresponding layer on the vessel wall. When spraying a polyurethane material, this material is applied to the corresponding surface by a spray process. In both processes, the fully cured skin is removed from the mold and back-injection-molded with a thermoplastic plastic material in a separate process step. This process is also referred to as "SkinForm Process" (SkinForm=trademark of Krauss-Maffei Kunststofftechnik GmbH). Such method for overcoating a skin is described in DE 699 05 745 T2 or EP 0 995 568 A1. The first document describes different alternatives for a method for producing a multilayered synthetic molded part, wherein initially a skin is produced—for example by a spray process—which is then back-injection-molded in a second production step in various ways.

In process flows currently known, a closed mold with a closed cavity is typically used for fin-free overflooding of a thermoplastic support component with a polyurethane material in a fully automated cycle. Venting of the cavity which is necessary for filling in the polyurethane material remains a problem. Almost all polyurethane systems must be thoroughly vented, which is particularly important for foamed systems. After each venting operation, the component must be reworked—albeit sometimes only slightly—in order to remove the sprues or projections formed in the vent cavities. The necessary venting operation frequently also limits the design choices.

In addition, devices and methods for producing décor materials which are back-molded with a thermoplastic material are known since quite some time. One example of this technology is disclosed in EP 0 543 085. According to the teachings therein, a décor layer is clamped between two molds. A not yet cured thermoplastic material is applied on one of the molds, which is molded, when the molds close, over the décor layer in an molding step commensurate with the cavity design of the mold. The formed part with the décor can be removed after cooling, whereby the thermoplastic material represents the support. This process is therefore very similar to the aforementioned SkinForm process.

It would therefore be desirable and advantageous to provide an improved method for producing composite components, which obviates prior art shortcomings and is able to specifically to eliminate venting of the mold.

SUMMARY OF THE INVENTION

According to one aspect of the present invention, the polyurethane material is introduced not into a closed mold, but is apply or sprayed onto an open mold half of a mold. The mold half with the not yet fully cured polyurethane material is subsequently enclosed with another mold half, which holds, for example, a thermoplastic substrate forming the thermoplastic plastic support. The polyurethane material is hereby pressed or pushed onto the thermoplastic substrate (also referred to as preform) and reacts with the substrate by forming a composite component. This low-pressure pressing process significantly improves venting of the mold cavity. It will be understood that the polyurethane mold half can also be pressed on the thermoplastic mold half by an molding process, wherein the molding step distributes the polyurethane in the cavity.

Advantageously, the polyurethane layer is applied to the cavity surface during the same cycle in which the melt is introduced into the first mold. In this way, both a preform and another coated composite product can be fabricated in each cycle. Alternatively, the polyurethane layer can also be applied to the cavity surface following introduction of the melt into the first mold and after the first mold is later opened. The production process may then take slightly longer, in particular if one has to wait until the polyurethane material has been applied to the mold surface, before the mold can be closed again. This alternative method, however, has the advantage that the operation may be performed with only a single mold.

The polyurethane material can be applied to the cavity surface of an open mold by spraying or spray-molding. Alternatively, a support layer, for example in form of a foil, may be used, on which the polyurethane material is or was applied outside the mold. Thereafter, the support layer, i.e., the foil, is inserted together with the polyurethane into the mold cavity. The foil can hereby a secured in a clamping frame. Regardless if the polyurethane material is applied directly onto the cavity surface of a mold or is applied to a support layer, a polyurethane mixing head or spray head can be used for directly applying the polyurethane material.

Advantageously, several different polyurethane materials can be sprayed onto the cavity surface consecutively (for example in different regions). Locally different haptics or local reinforcements can be realized in this way. Likewise, materials with different properties and colors can be employed. Moreover, highly viscous and/or highly loaded polyurethane systems can be processed with this method.

The injection-molded part forming the substrate can be repositioned by rotation, for example by using a rotary table, an indexing plate arrangement or a turning plate, or by linear displacement with a sliding table arrangement. The devices of a rotary table, an indexing plate arrangement or a turning plate as well as of a sliding table are known in the art. If the substrate is not repositioned, but the mold half with the polyurethane material is instead associated with the mold half with the injection-molded part, then this can likewise be performed with a rotary table, an indexing plate arrangement, a turning plate or a sliding table arrangement.

To ensure that the polyurethane material is readily released from the cavity surface, a release agent can be applied to the cavity surface before application of the polyurethane material.

Moreover, a varnish layer can be applied to the cavity surface before application of the polyurethane material. This method, referred to as "In-Mold Technique", can be used to produce varnished polyurethane surfaces.

It will be understood that other insert materials can be introduced into the cavity before the polyurethane material is filled in.

To prevent that the polyurethane material is pressed out of the cavity when the two mold halves close and the polyurethane is compressed on or molded, a clamping frame can be disposed between the mold half with the substrate and the polyurethane mold half. The clamping frame is provided for sealing the cavity from the ambient, in particular before the actual molding process. Alternatively, a dipping tool can be used.

According to another advantageous embodiment, an insert, which encompasses at least a substantial portion of the cavity recess, is inserted into the mold half of the polyurethane mold. The polyurethane material can be introduced in the insert outside the clamping unit. The insert is then inserted into the mold half together with the polyurethane material, wherein in a subsequent step, the mold is closed and the polyurethane material is pressed onto the thermoplastic substrate. With this embodiment, several such inserts can advantageously be provided, which can be operated in parallel in the various process steps. For example, another insert can already be sprayed outside the clamping unit during an molding process. In addition, the inserts may have different shapes and surface structures.

When using such insert, it should preferably be possible to affix the inserts in the mold half. For example, a quick-gripping or bayonet system could be used for this purpose.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1a shows a schematic diagram of a clamping unit of an injection molding machine, which will be used to describe the method of the invention.

DETAILED DESCRIPTION OF PREFERRED EMBODIMENTS

Figure 1B:
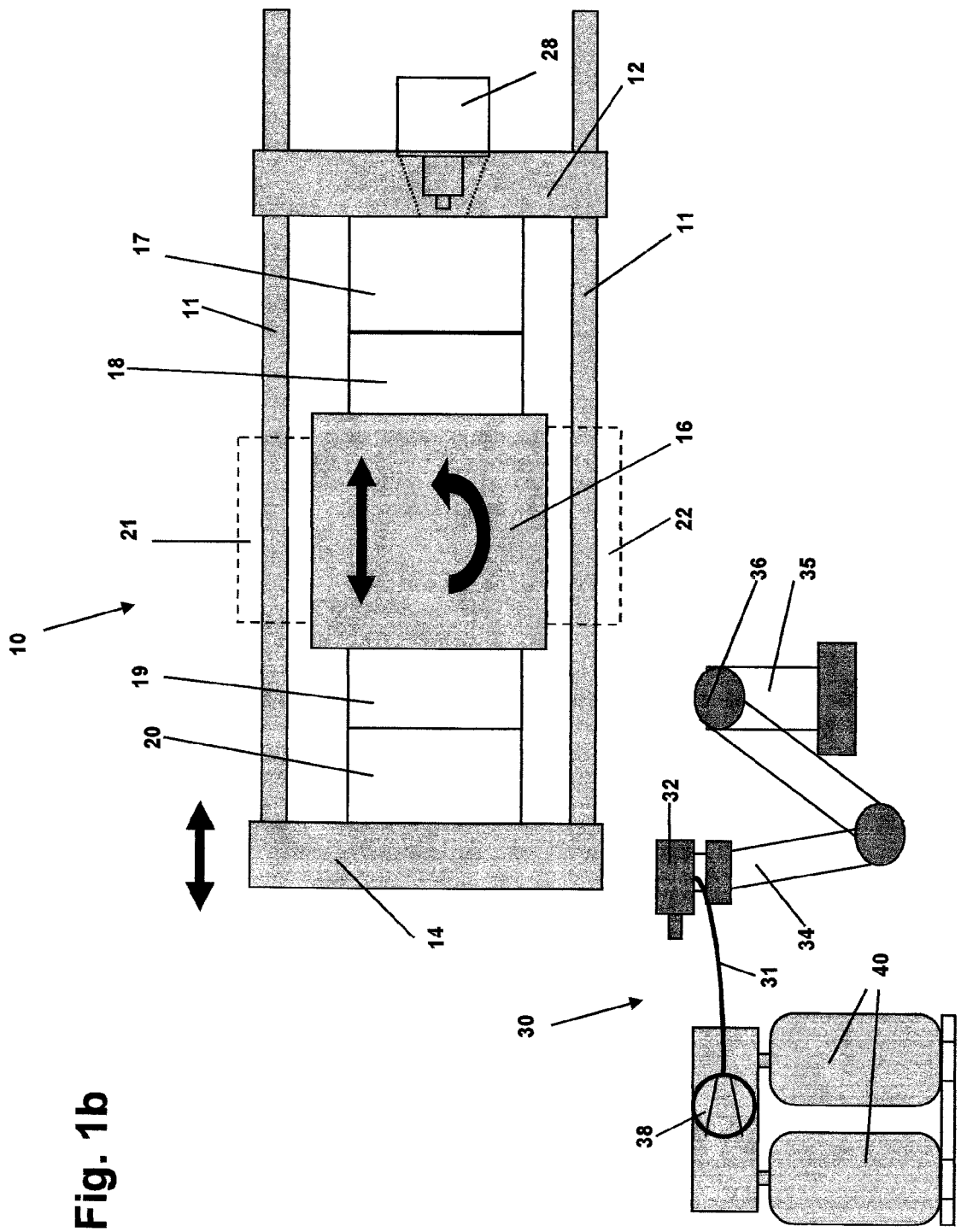
FIG. 1b shows the clamping unit of FIG. 1a in a closed position.

Throughout all the figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIGS. 1a and 2b, there are shown schematic diagrams of a clamping unit 10 in an open (FIG. 1a) position and in a closed (FIG. 1b) position. In addition to the clamping unit 10, the entire facility should also include a plasticizing and injection unit as well as a polyurethane unit, indicated here schematically with the reference symbols 28 and 30, respectively. However, this rather simplified diagram is sufficient for describing the method of the invention. The clamping unit can here be part of a standard injection molding machine.

The clamping unit 10 of FIGS. 1a and 1b includes a central turning plate 16, which is configured for rotation about a vertical axis (indicated by the curved arrow). The bottom section (not illustrated) of the turning plate 16 is movably supported (indicated by the double arrow) for axial displacement on a machine bed.

Mold halves are attached to the sides of the cubic turning plate 16, wherein the two opposite mold halves 18 and 19 are indicated in FIGS. 1a and 1b by a continuous line. Two additional mold halves 21 and 22 are indicated only by a broken line, because these are mold halves optional and may be omitted.

The turning plate 16 is received between two platens 12 and 14, wherein the platen 14 can move back and forth, as indicated by the double arrow. The platen 12 is fixed. The drives for the platen 14 and the turning plate 16 are here not illustrated.

Four tie rods 11, of which only two are visible in the Figures, are arranged between the two platens 12 and 14. Mold halves 17 and 22, which cooperate with the respective opposite mold halves of the turning plate 16 to form a respective cavity when the clamping unit is closed, are attached to both platens 12 and 14.

The front end of a plasticizing and injection unit 28 located outside the platen 12 is only schematically indicated on the right-hand side of FIGS. 1a and 1b. The plasticizing and injection unit 28 produces a plastic melt which can be introduced into the cavity of the mold consisting of the mold halves 17 and 18.

The polyurethane unit 30 is associated with the mold located on the left-hand side in FIGS. 1a and 1b (here: mold halves 19 and 20). The polyurethane unit 30 includes a mixing head 32 which is attached on the front end of a movable first robotic arm 34 of a first robot 35. The first robotic arm 34 is secured with an actuating and attachment bracket 36 on the floor or on a wall.

The mixing head 32 receives from one or several containers 40 via one or more pumps 38 and corresponding supply lines 31 (also referred to as medium lines) a polyurethane material or different polyurethane starting materials, which are mixed in a mixing chamber of the mixing head 32 and subsequently applied from the mixing head (e.g., sprayed). The mixing head 32 can be moved by the movable first robotic arm 34 (as illustrated in FIG. 1a) into the space between the two mold halves 19, 20 of the open clamping unit, or can be positioned (as illustrated in FIG. 1b) outside the clamping unit.

The process performed with the clamping unit and illustrated in FIGS. 1a and 1b will now be described:

The clamping unit 10 can be moved between an open position (FIG. 1a) and a closed position (FIG. 1b) by moving the platens 12 and 14. In the closed position (FIG. 1b), mold cavities are formed between the mold halves 17 and 18, and 19 and 20, respectively, which are only schematically illustrated by a broken line.

First, in the position of FIG. 1b, after the plasticizing and injection unit 28 has docked with the mold, a melt is injected into the cavity of the formed mold. In this way, a thermoplastic preform is produced, which cures at least partially before the clamping unit 10 is opened again.

FIG. 1a depicts the clamping unit 10 which is opened following this injection process, wherein a preform 23 remains positioned in the mold half 18.

After the clamping unit 10 is opened, the mixing head 32 is moved by the robotic arm 34 into the intermediate space between the form halves 19 and 20 for spraying the cavity surface of the mold half 20 with a polyurethane material. At the same time, the turning plate 16 is first rotated counterclockwise by 90° in order to move the completed composite part 23' out of the range of the clamping unit to facilitate removal from the cavity of mold half 19. A corresponding removal device is not shown in the Figures. The turning plate 16 is then rotated further counterclockwise by 90°, so that the mold half 18 together with the preform 23 are now located opposite the mold half 20 which was previously sprayed with the polyurethane material.

On the other hand, following a rotation by 180°, the empty cavity of the mold half 19 is now positioned opposite the mold half 17. After retraction of the robotic arm 34, the clamping unit 10 is closed again. During the closure operation, the not yet fully cured polyurethane material applied to the cavity surface of the mold half 20 is pressed onto the preform and is distributed from the region defined by the cavity over the surface of the preform 23. In parallel, when the clamping unit 10 is completely closed, a thermoplastic plastic melt is introduced again into the closed mold on the opposite side.

After the polyurethane material is at least partially cured on the preform and after the thermoplastic substrate in the other mold (mold halves 17 and 18) has at least partially hardened, the clamping unit 10 is opened again, with the process continuing as described above, i.e., the turning plate is first rotated by 90°, the completed composite part is removed, whereafter the turning plate is again rotated counterclockwise by another 90°. The cavity surface of the mold half is again sprayed with polyurethane material, and a new clamping operation is started.

During each clamping operation, a thermoplastic substrate material (preform) and a finished composite part can be produced in the same cycle. Advantageously, the cavity is safely vented when the two mold halves 19 and 20 move close to one another, so that the polyurethane material is uniformly molded on the preform.

It will be understood that the method described with reference to FIGS. 1a and 1b can be further modified. For example, additional process steps can be added when using four identical mold halves 18, 19, 21 and 22. For example, an activation step for the surface of the thermoplastic substrate can be performed at the position of the mold half 21. Particular suitable processes are plasma processes, flaming processes or coating processes. Moreover, before the polyurethane material is applied to the cavity surface of the mold half 20, a release agent can be applied with an (unillustrated) device to the cavity surface, so that the polyurethane material can be easily released from the cavity surface even after partial or complete curing. The polyurethane unit can also be implemented in different ways. Different materials can be mixed together and switching devices can be implemented, allowing different material combinations to be applied consecutively. In this way, regions with different properties, for example differently colored surfaces, different reinforcement structures, different haptics, etc., can be formed.

Alternatively or in addition to applying a release agent, a varnish layer can also be applied to the cavity surface of the polyurethane mold 20.

Like with molds employed in expansion molding, optionally clamping frame systems can be integrated in the mold. Before the mold consisting of the mold halves 19 and 20 is fully closed and/or before the polyurethane material comes into contact with the thermoplastic substrate, the clamping frame can close the mold cavity and thereby largely seal the mold cavity against the ambient. The polyurethane material is thus prevented from entering the plane separating the molds and remains instead in the cavity. Advantageously, air is pressed out of the cavity during the molding operation, thereby ensuring finless fabrication of composite parts.

As an alternative to the method described with reference to FIGS. 1a and 1b, the polyurethane can also be applied externally onto a foil. The sprayed foil can be inserted into the cavity of the mold half 20 with a handling device. The foil may be affixed to a clamping frame. The entire clamping frame is inserted into the polyurethane mold half. Advantageously, the polyurethane mold half need not be sprayed with a release agent, because the foil itself can act as release agent. In addition, the foil may be sprayed in a separate cabin located next to the injection molding machine, which can be done in parallel with the injection cycle, thereby further reducing the cycle time. The spray process using a foil can also be performed horizontally, thereby avoiding the risk that the polyurethane layer leaks out or slides off. However, care should be taken that the polyurethane material is not yet fully cured before being introduced with the foil into the cavity of the mold half 20 and pressed onto the thermoplastic substrate.

When using smaller molds, the mold halves can also be exchanged in each cycle. Alternatively, an insert for a mold half can be provided. With this approach, the externally sprayed cavity surface or the insert with the polyurethane mold half would first be attached to the platen or the mold half, respectively, for example with a mechanical or hydraulic quick-clamping system. Attachment could also be performed with a conventional tandem technology by way of a bayonet system. In parallel, the surface of another mold half or another insert may be cleaned, inserted, optionally varnished and sprayed with a polyurethane system.

The polyurethane mold half is exchanged after removal of the components. The mold half can also be removed together with the component, and the component is demolded later. Exchange of a mold half 20 or use of a corresponding insert for the mold half 20 would also allow formation of a different surface structure from one charge to the next. Moreover, the release agent varnish and the polyurethane spray system may be applied in an enclosed cabin.

Figure 1C:
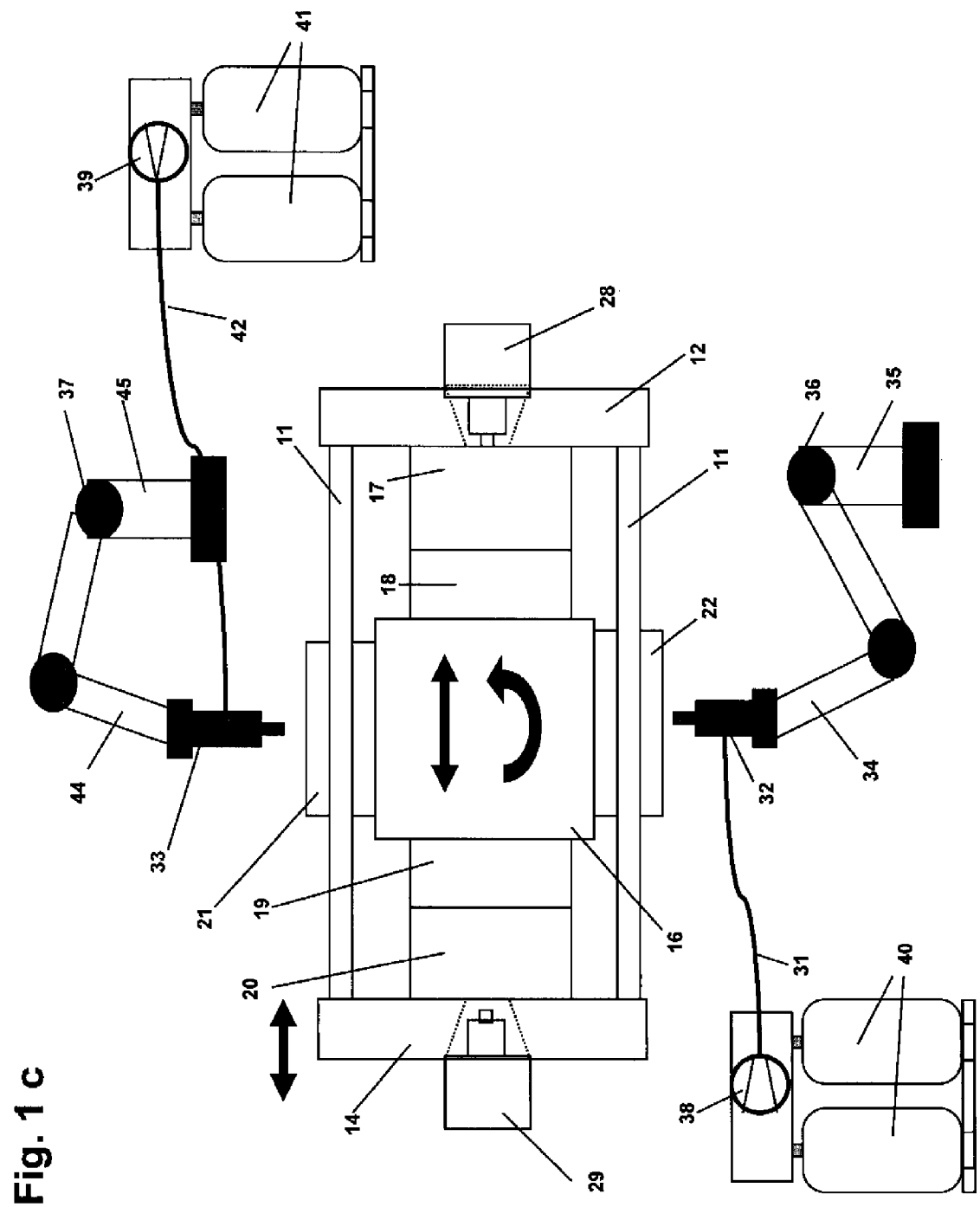
FIG. 1c shows a schematic diagram of a clamping unit as illustrated in FIG. 1a, with two associated plasticizing and injection units, wherein the clamping unit is closed.
Figure 1D:
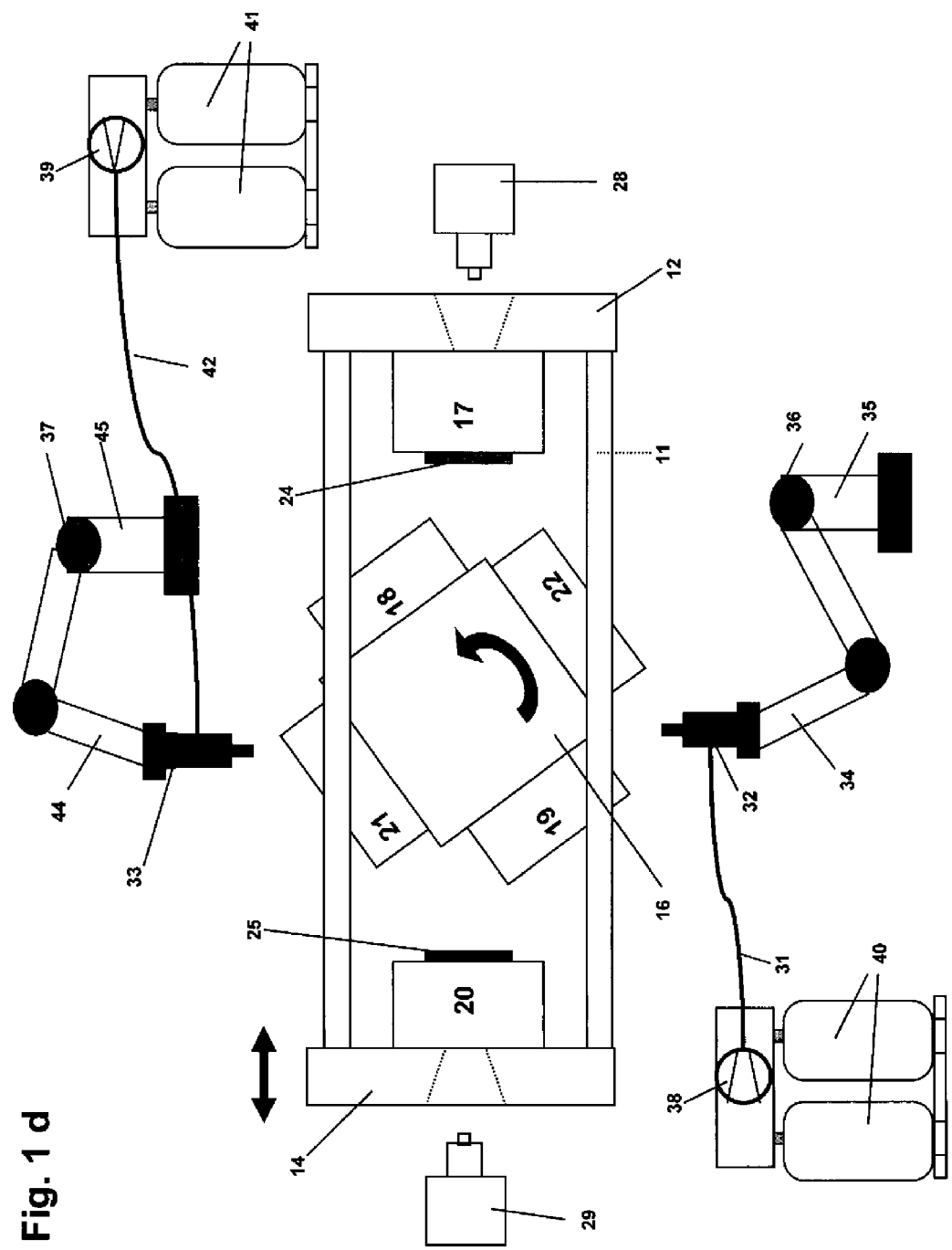
FIG. 1d shows the schematically illustrated clamping unit of FIG. 1c in an open position.

A slightly modified embodiment of an alternative method is illustrated in FIGS. 1c and 1d. Elements of the system which are identical to those depicted in FIGS. 1a and 1b are designated with the same reference symbols.

A clamping unit 10 is again illustrated with a fixed platen 12, a movable platen 14 and a turning plate 16 (rotatable and axially movable), wherein in this embodiment a mold half 18, 19, 21 and 22 is arranged on each side of the turning plate 16.

Unlike the system in FIGS. 1a and 1b, two plasticizing and injection units 28 and 29 are provided for forming preforms in the cavities of the mold halves 17 and 18, and 19 and 20, respectively. In addition, rather than a single polyurethane facility, two polyurethane facilities are provided which include mixing heads 32, 33, robotic arms 34, 44 of robots 35, 45 which are rigidly attached (mounts 36 and 37), containers 40, 41, pumps 38, 39, and polyurethane media lines 31, 42.

This facility operates with a different process flow. In a first cycle (FIG. 1c), two preforms are formed in the closed cavities of molds 17 and 18, and 19 and 20, respectively. At the same time, polyurethane material is sprayed with the mixing heads 32 and 33 onto the cavity surfaces of mold halves 21 and 22. This process can be performed at the same time the material for the preforms is introduced and cures. Once the preforms 24 and 25 are sufficiently cured, the clamping unit 10 is opened, with the preforms 24 and 25 remaining in the mold halves 17 and 20, respectively, and the turning plate being rotated counterclockwise by 90°. The clamping unit is then again closed, whereby the not yet hardened polyurethane material is pressed onto the preforms that remained in the mold halves 17 and 20. After the polyurethane material is at least partially cured, the clamping unit can again be opened for removing the finished products. The turning plate is then again rotated by 90°, either clockwise or counterclockwise, and the cycle is repeated. In this way, two respective products can be produced with a standard machine in the same cycle. This production method is particularly advantageous for producing two mirror-symmetric pieces.

Figure 1E:
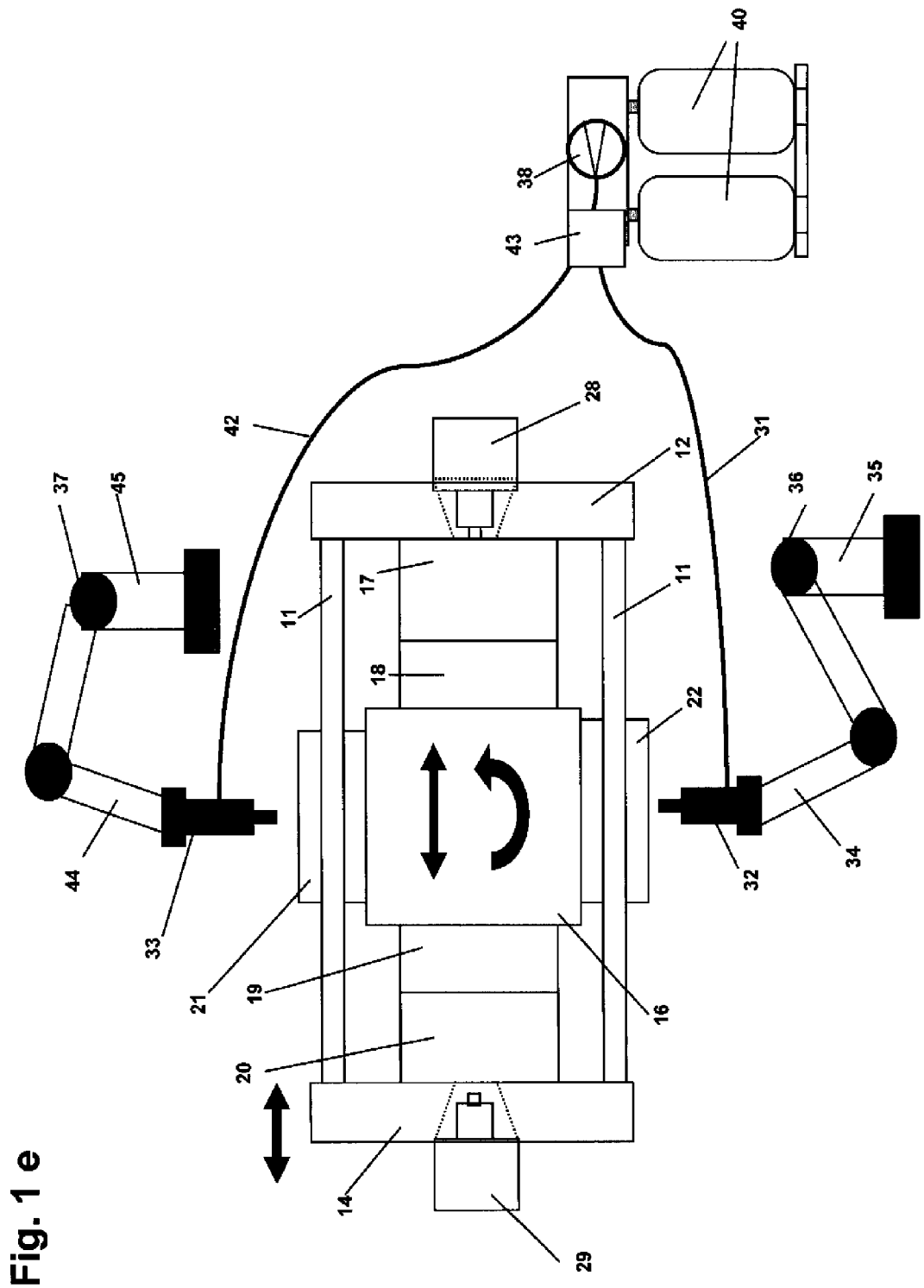
FIG. 1e shows schematically a clamping unit as illustrated in FIG. 1c, wherein two mixing heads are supplied by a single polyurethane facility.

The embodiment depicted in FIG. 1e is different from that of FIGS. 1c and 1d only in that the two mixing heads 32 and 33 are supplied from a single polyurethane facility with containers 40 and pump 38. A switching unit 43 for alternatingly supplying the two mixing heads 32 and 33 is provided. This embodiment is particularly useful if the spray process for applying the polyurethane material takes much less time that the production of the preforms. In this case, the time for spraying the cavity surfaces with only a single polyurethane facility is sufficient.

Another embodiment of the clamping unit of an injection molding machine for realizing another embodiment of the method of the invention is illustrated in FIGS. 2a and 2b.

These Figures show a clamping unit 50 with a fixed platen 52 and a movable platen 54. The movable platen 54 is movably guided on four tie rods 56. The end section of a plasticizing and injection unit 51 is associated with the fixed platen 52.

Figure 2:
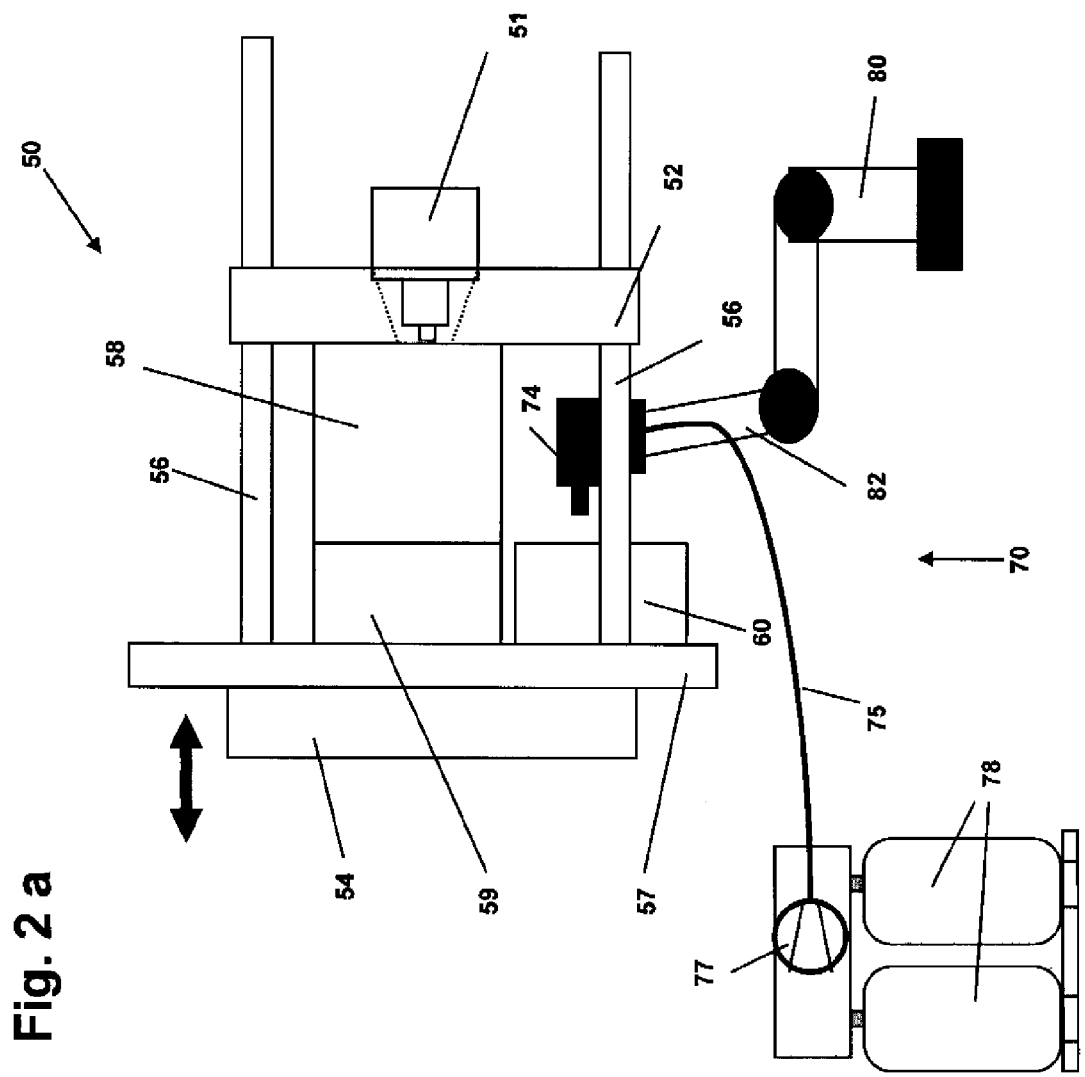
FIG. 2a shows a schematic diagram of another embodiment of a clamping unit of an injection molding machine with a sliding table assembly in a first position, which is used to illustrate another embodiment of the method of the invention.
FIG. 2b shows the embodiment of FIG. 2a of a schematically illustrated clamping unit of an injection molding machine in a second position.
Figure 2:
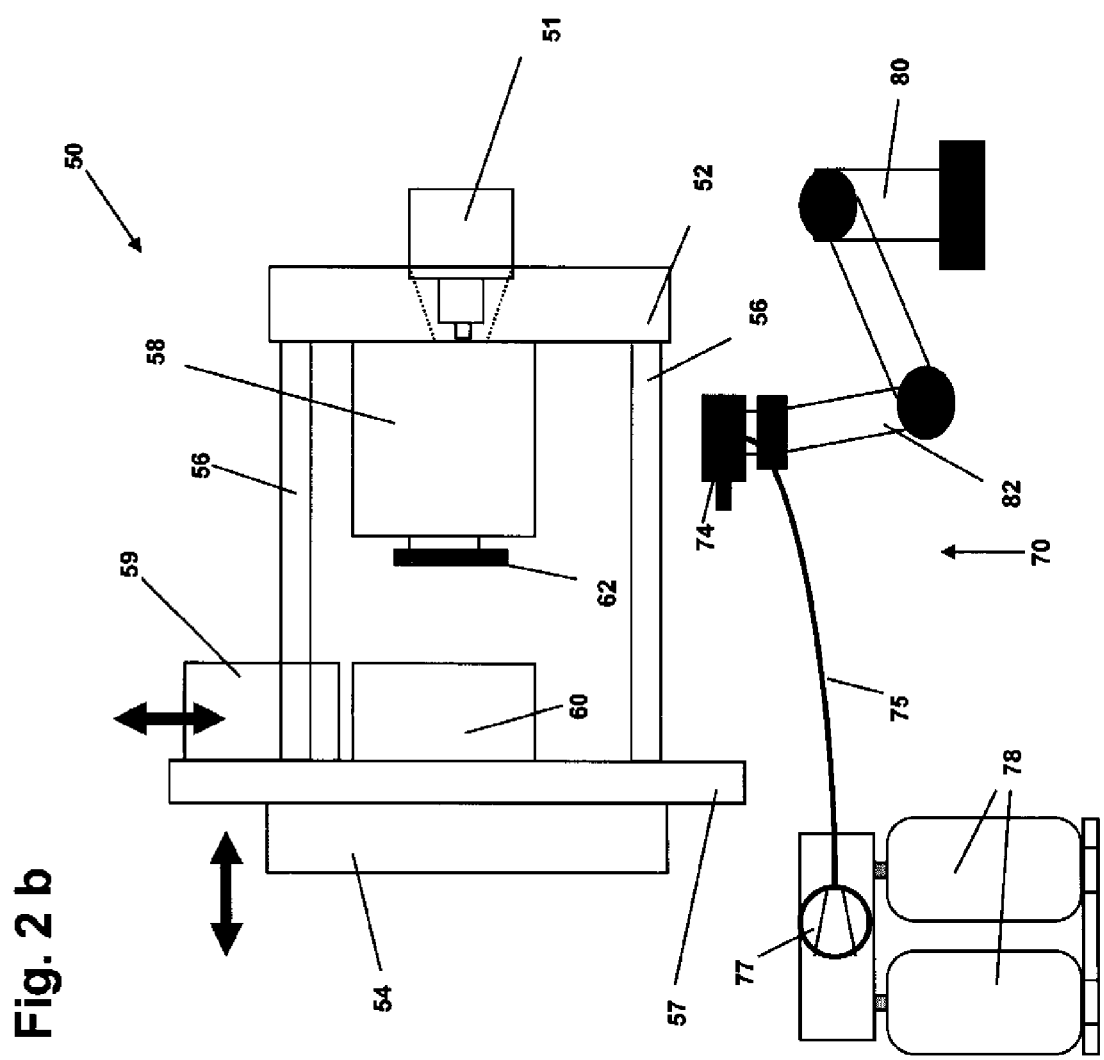

Schematically indicated is a sliding table arrangement 57 attached to the movable platen 54 which can be moved up and down—as indicated in FIG. 2 by the double arrow. The sliding table arrangement 57 carries two mold halves 59 and 60.

An additional mold half 58 is arranged on the fixed platen 52. This mold half 58 can cooperate with the mold half 59 or with the mold half 60, depending on the position of the sliding table arrangement 57.

FIGS. 2a and 2b show schematically also a polyurethane unit 70 with a mixing head 74 which receives starting material via a supply line 75 from one or several containers 78 by way of one or several pumps 77. This material is mixed together in the mixing head 74 and deployed.

The mixing head 74 attached to a front end of a robotic arm 82 can once more be moved by a robot 80.

The process of the invention is carried out with the device shown in FIGS. 2a and 2b as follows:

Initially, all mold halves are empty and the clamping unit 50 is in the open position. The clamping unit 50 is then closed and the platen 54 is moved to the right, so that the mold half 59 contacts the mold half 58, forming a first cavity. In this position, a plastic material can be filled into the cavity with the plasticizing and injection device 51.

A polyurethane material can be concurrently applied to the cavity surface of the mold half 60 using the mixing head 74. The clamping unit 50 is opened after the thermoplastic substrate material (preform) is at least partially cured in the cavity of the two mold halves 58 and 59. The preform remains in the mold half 58. The sliding table is then moved upward so that the mold half 60 with the polyurethane material is positioned exactly opposite the mold half 58. The clamping unit 50 is now closed again, whereby in the final stage of this motion the polyurethane material is pressed against the preform in a second cavity. After the polyurethane material is at least partially cured, the platen is again opened and the sliding table 57 is moved downward. The finished composite part can now be removed, and a new cycle can be started.

In this embodiment, too, an insert for the mold half 60 or a foil as a support layer can be employed. Accordingly, the embodiment depicted in FIGS. 2a and 2b is different from the embodiment of FIGS. 1a and 1b only in that a sliding table is employed instead of a turning table arrangement.

Figure 4:
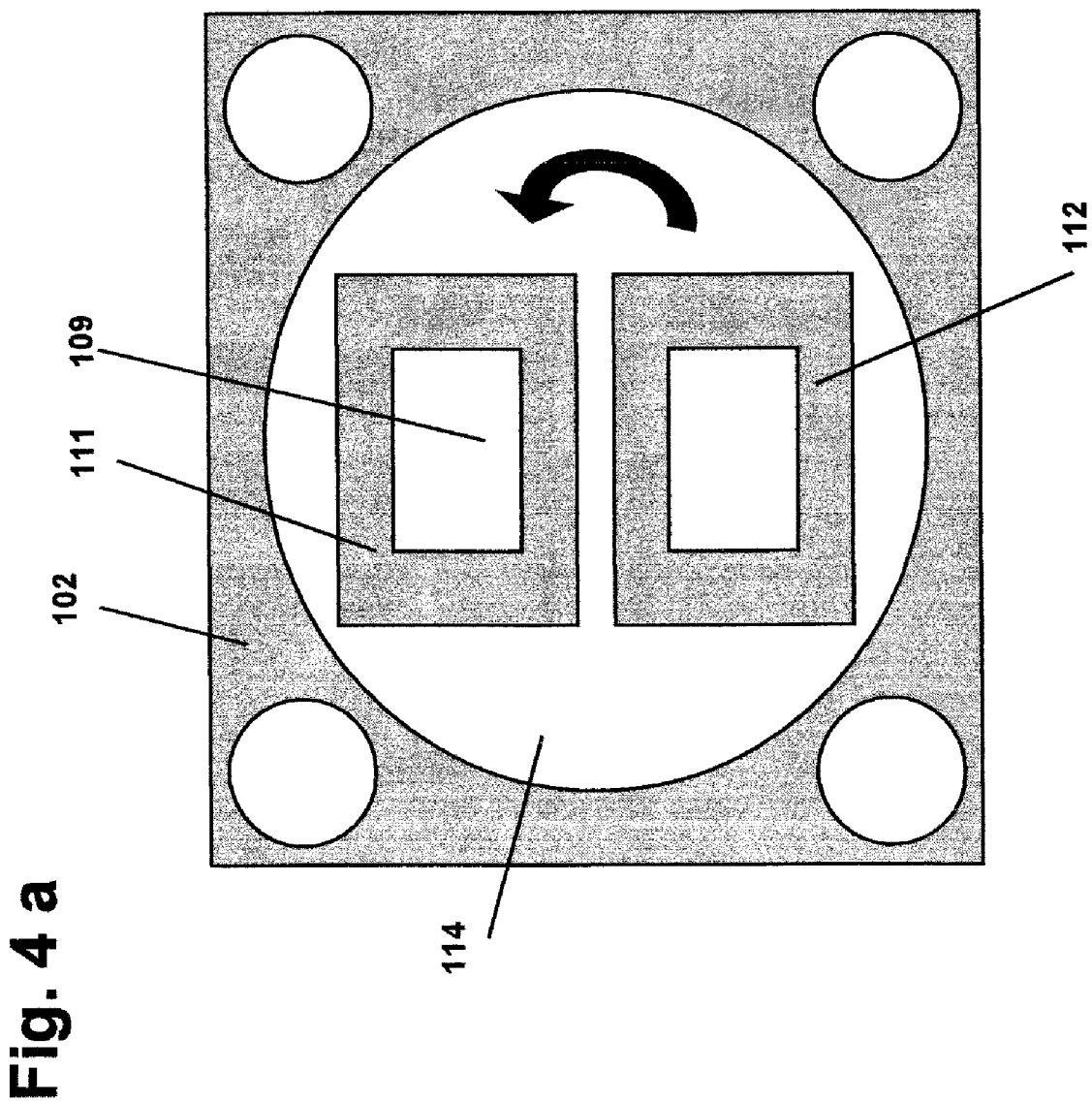
FIGS. 4a and 4b show in a schematic top view the platens of the clamping unit of FIG. 3.
Figure 4:
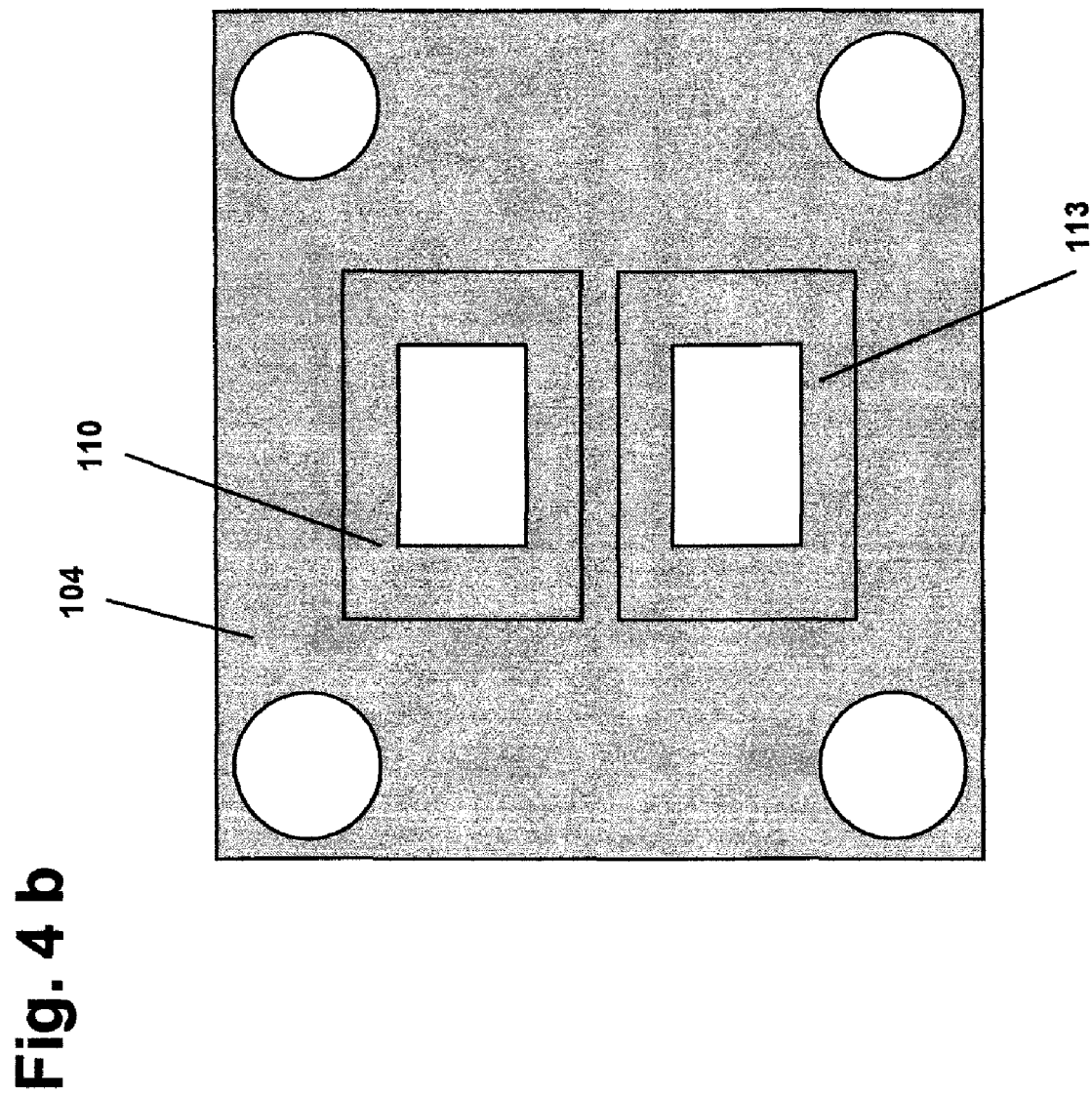

Another embodiment employing a rotary table will now be described with reference to FIGS. 2, and 4a and 4b, respectively. These Figures show a clamping unit 100 with a fixed platen 104 and a movable platen 102, wherein the movable platen 102 can be moved back and forth on four tie rods 106. The movable platen 102 also supports a rotary table arrangement 114, on which two mold halves 111 and 112 are arranged. Likewise, two mold halves 110 and 113 are also formed on the opposite fixed platen 104.

Once more, a plasticizing and injection unit 108 is provided with which a plastic molten material can be introduced into the cavity of a closed mold formed by the mold halves 110 and 111.

This embodiment further includes a polyurethane unit 120 with a mixing head 122 arranged on a movable robotic arm 124. The robotic arm 124 is movably and actuatably attached to a bracket 126. The mixing head 122 receives the corresponding starting materials from pumps 128 and containers 130 via the supply line or via several supply lines, mixes the starting materials and applies the mixture onto a cavity surface.

The process flow of the process according to the invention in this third embodiment is as follows:

After the robotic arm 124 is moved out of the intermediate space between the two platens 102 and 104, and after the clamping unit 100 is closed, a melt is filled into a still empty cavity of the mold consisting of the mold halves 110 and 111 by docking with the plasticizing and injection unit 108. After the thermoplastic plastic melt is at least partially cured, the clamping unit 100 is opened by moving the movable platen 102, wherein (as indicated schematically in FIG. 3) the preform 109 remains in the mold half 111 and moves to the left together with the movable platen 102. After the clamping unit 100 has been opened, the mixing head 122 of the polyurethane unit 120 is moved in front of the cavity surface of the mold half 113 for applying a polyurethane material onto the cavity surface. In parallel, the rotary table arrangement 114 is rotated, so that the mold half 111 with the preform is positioned opposite the mold half 113 which is coated with the not yet fully cured polyurethane. After the robotic arm 124 is retracted, the clamping unit 100 can be closed again, whereby the polyurethane material is pressed onto the preform and coats the preform in the cavity space. In parallel, a new preform is formed in the upper mold of FIG. 3.

After the clamping unit 100 is once more opened, the finished composite part can now be removed from the mold half 112 or the mold half 113. The rotary table arrangement 114 can now be again rotated and a new cycle can be started. In this way, a preform is formed during each cycle in the upper region of the arrangement of FIG. 3, whereas in the lower region a composite part is formed which is composed of the preform and the coated polyurethane material.

As already mentioned above in conjunction with the other embodiments of the process, additional units and assemblies can be added to the system. For example, a unit for applying a release agent onto the cavity surface of the mold half 113 can be provided. Additional units for cleaning the cavity surfaces or for removing individual parts (for example, the composite part) can be provided. The polyurethane unit 120 can also be configured differently, so that polyurethane materials with different properties can be applied to the cavity surface of the mold half 113 in parallel or consecutively.

Figure 3:
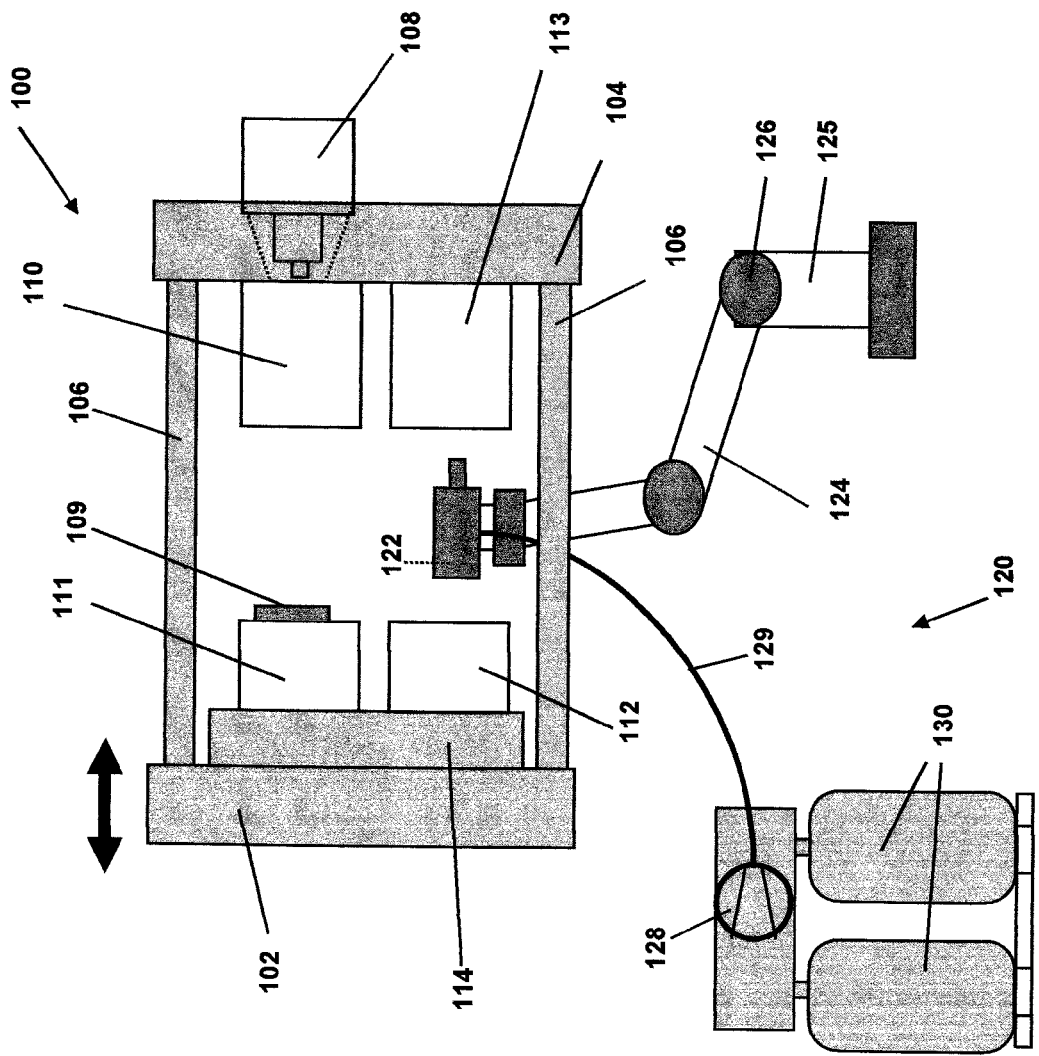
FIG. 3 shows in a schematic diagram another embodiment of a clamping unit with a rotary table assembly, which is used to illustrate another embodiment of the method of the invention.

The two mold halves 112 and 111 in the embodiment of FIG. 3 are constructed identically. The mold halves 110 and 113 are constructed differently.

Overall, the present invention makes it possible to use the polyurethane spray technology for the production of multi-component composite parts with high-quality polyurethane surface structures. In addition, the low-pressure process ensures low wear of the molds, in particular at the plane separating the molds. With the aforedescribed molding methods, a very thin polyurethane layer can be formed on a thermoplastic support. Unlike with conventional methods, no vent cavities are required, which allows greater freedom in the design. In addition, different techniques can be combined, so that conventional methods, for example the Long-Fiber-Injection technique (use of fibers in a polyurethane material) can be integrated.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalent of the elements recited therein:

1. A method for producing a coated composite component, comprising the steps of:
    producing a thermoplastic plastic support by introducing a melt into a closed cavity of a first mold,
    opening the first mold, while leaving the produced thermoplastic plastic support in a mold half of the first mold,
    applying a polyurethane layer onto a cavity surface of a mold half of a polyurethane mold,
    associating the thermoplastic plastic support that was left in the mold half of the first mold with the mold half of the polyurethane mold that has the applied polyurethane layer,
    closing a second mold which includes both the mold half with the thermoplastic plastic support and the mold half with the polyurethane layer, thereby pressing or molding the applied polyurethane layer onto the thermoplastic plastic support and distributing the applied polyurethane layer over a surface of the thermoplastic plastic support in a region defined by a cavity of the second mold,
    at least partially curing the applied polyurethane layer,
    opening the second mold, and
    removing the coated composite component.

2. The method of claim 1, further comprising the step of repositioning the thermoplastic plastic support in the mold half of a first mold, before the second mold closes for pressing or molding the polyurethane layer onto the injection molded part.

3. The method of claim 1, wherein the polyurethane layer is applied to the cavity surface in the same cycle in which the melt is introduced into the first mold.

4. The method of claim 1, wherein the polyurethane layer is applied to the cavity surface after introduction of the melt into the first mold and after opening the first mold.

5. The method of claim 1, wherein the polyurethane layer is applied by spraying polyurethane onto the cavity surface.

6. The method of claim 1, wherein the polyurethane layer is applied by coating polyurethane on a support layer, which support layer is subsequently inserted into a cavity recess of a mold half.

7. The method of claim 6, wherein the polyurethane layer is applied to the support layer in a separate device located adjacent to an injection molding machine that produces the thermoplastic plastic support.

8. The method of claim 6, wherein the support layer is implemented as a foil or décor.

9. The method of claim 8, wherein the foil or décor is affixed to a clamping frame.

10. The method of claim 6, wherein the polyurethane layer is applied to the cavity surface or to the support layer with a movable polyurethane mixing head.

11. The method of claim 1, and further comprising the step of applying polyurethane materials with different properties onto the cavity surface simultaneously or consecutively with application of polyurethane layer.

12. The method of claim 1, wherein the polyurethane layer is made of a highly viscous or highly loaded polyurethane material.

13. The method of claim 2, wherein the injection-molded parts are repositioned through rotation with a rotary table, with an indexing plate arrangement or with a turning plate, or through displacement with a sliding table, or with a combination thereof.

14. The method of claim 1, further comprising the step of applying a release agent to the cavity surface, before the polyurethane layer is applied.

15. The method of claim 14, wherein the release agent comprises a foil or a décor.

16. The method of claim 1, further comprising the step of applying a varnish layer to the cavity surface, before the polyurethane layer is applied.

17. The method of claim 1, further comprising the step of inserting an insert material in the cavity surface, before the polyurethane layer is applied.

18. The method of claim 1 further comprising the step of inserting a clamping frame between the mold half with the thermoplastic plastic support and the mold half with the applied polyurethane layer, with the clamping frame sealing the cavity against the ambient before the polyurethane layer is pressed or molded on the injection molded part.

19. The method of claim 1, further comprising the steps of providing the mold half of the polyurethane mold with an insert, forming a cavity recess in the insert, applying the polyurethane material to the cavity surface of the insert outside the clamping unit, and inserting the insert into the second mold half.

20. The method of claim 19, wherein several inserts are provided and different inserts are inserted sequentially into the second mold half.

21. The method of claim 20, wherein at least two inserts are formed with different cavity recesses or different cavity surfaces.

22. The method of claim 19, wherein the insert is mounted with a quick-gripping or bayonet system.

23. The method of claim 19, wherein the coated thermoplastic plastic support is removed from the mold together with the insert.

24. The method of claim 1, wherein the mold half with the polyurethane layer is constructed from steel, aluminum, plastic or an electro-formed material.

25. The method of claim 1, comprising the steps of in a first cycle, producing the thermoplastic plastic support in the first mold at the same time the polyurethane material is applied to the cavity surface of the mold half of the polyurethane mold, associating the corresponding mold halves of the first mold and the second mold after the first cycle and before starting a second cycle, and in the second cycle, molding the polyurethane layer on the thermoplastic plastic support.

26. The method of claim 25, wherein the mold halves are associated through rotation of the mold halves by 90°.

27. The method of claim 10, wherein the polyurethane layer is applied by using at least two polyurethane mixing heads, which are alternatingly supplied from a single polyurethane facility by way of a switching unit.

\* \* \* \* \*